United States Patent Office 2,802,746
Patented Aug. 13, 1957

2,802,746
STAIN AND METHOD OF APPLICATION

Herman R. Nack, Troy, and William Allshire Waldie, Dayton, Ohio, assignors to Chadeloid Corporation, Dayton, Ohio, a corporation of Delaware No Drawing. Original application June 29, 1951, Serial No. 234,475, now Patent No. 2,691,596, dated October 12, 1954. Divided and this application June 3, 1954, Serial No. 435,911

8 Claims. (Cl. 106—34)

This invention relates to a new and novel wood stain and to a method of producing the same.

Derivatives of cellulose of low and medium viscosity such as the monovalent metal salts of carboxy alkyl cellulose, for example, sodium carboxy methyl cellulose, have relatively good solubility in water but are substantially insoluble in the organic solvents. Accordingly these materials have not been considered to be useful in conjunction with wood stains where the presence of water is generally undesirable as this solvent leads to raising of the grain of the wood.

This is a division of application Serial No. 234,475, filed June 29, 1951, now U. S. Patent No. 2,691,596.

It is an object of this invention to provide a stain of excellent coloration properties containing a monovalent metal salt of a carboxy alkyl cellulose.

It is a further object to provide a method of incorporating a monovalent metal salt of a carboxy alkyl cellulose into a wood stain.

It has been found that the monovalent metal salt of a carboxy alkyl cellulose may be effectively employed in producing stains if the cellulose derivative is reacted in solution with an inorganic compound capable of yielding a colored ion, the reaction between the inorganic compound and the carboxy alkyl cellulose effecting a colored precipitate. This precipitate is substantially water insoluble and soluble in most organic solvents only with the greatest difficulty. However, it has been found that if the precipitated material is treated with tetrahydrofurfuryl alcohol containing less than about 1.0% of a strong alkali that solution may be effected to a degree which will permit the formation of an effective stain from the product of the above reaction.

The solution produced as set forth above may be thinned as required with methanol, toluol or xylol, which are compatible with the solved precipitate and the resultant material may then be employed as a stain for wood.

The effectiveness of the resultant stain is enhanced by the reaction of the monovalent salt on the carboxy alkyl cellulose which has a tendency to inhibit grain raising.

The invention will be more fully understood by reference to the following specific examples:

Example I

Two parts by weight of low viscosity sodium carboxy methyl cellulose were dissolved in 100 parts by weight of water with rapid agitation and at room temperature. Care was exercised to avoid lumping of the solute.

A saturated solution of ferric sulfate in water was then prepared by adding a considerable excess of the salt to the water and thoroughly agitating. The ferric sulfate dissolved very slowly but forms a fairly concentrated solution in a short time, which period varies with the degree of agitation and the fineness of the salt. The solved ferric sulfate was then separated by filtration from the excess of the salt.

The water solution of the carboxy methyl cellulose was then added to 40 parts of the saturated ferric sulfate solution slowly and with constant agitation. A voluminous brown precipitate appeared which settled out slowly. This precipitate was then carefully washed with water and dried. The precipitate has a dark brown and resinous appearance. z To the dried precipitate there was then added approximately 100 parts by weight of tetrahydrofurfuryl alcohol containing about 0.5% by weight of sodium hydroxide. The precipitate dissolved slowly in the alcohol-alkali solvent agitation equipment being employed to assist in speeding the process.

The brown solution obtained is fairly concentrated and for most staining purposes a thinner such as methanol, toluol or xylol is required which may be added to suit the needs of a particular staining operation.

The stain thus formed may be applied to a wood surface in the manner known to the art, the wood achieving a uniform brown coloration.

It may be noted that other ferric salts having a greater water solubility may replace ferric sulfate in the above composition.

Example II 3 grams of sodium carboxy methyl cellulose are first dissolved in 100 grams of water as set forth in Example I.

Approximately 20 grams of anhydrous copper sulphate may be dissolved in water to form a substantially saturated solution of the salt. Copper dissolves more readily than the ferric salt and accordingly agitation may be eliminated if desired but is generally preferable to speed formation of the solution. Filtration is not required.

The carboxy methyl cellulose solution may then be added slowly to the salt solution and a blue precipitate begins to form almost immediately. This precipitate is then washed with water and dried.

The dried product then may have added to it approximately 85 to 90 parts of tetrahydrofurfuryl alcohol containing approximately 1% of sodium hydroxide by weight. The resultant blue solution may then be thinned with toluol, methanol or xylol as set forth in Example I.

Example III

A solution containing approximately 2 grams of sodium carboxy methyl cellulose is prepared as set forth in Example I.

A green solution, containing 15 grams of anhydrous chromic chloride and a very small amount of chromous chloride as reducing agent, in water is prepared without agitation. The presence of the chromous salt assists the solution of the chromic chloride to such extent that agitation is not required. The chromous salt may be present in 100 grams of water to the extent of about 0.7%.

The chromic chloride solution is then combined with the solution of the salt of the cellulose derivative as set forth in Example I to obtain a greenish precipitate which is then washed wtih water and dried.

Approximately 115 grams of tetrahydrofurfuryl alcohol containing 0.8% by weight of sodium hydroxide are then combined with the precipitate to form a green stain which may also be thinned as described in Examples I and II.

The above examples are set forth by way of illustration only since inorganic salts which have a fair solubility in water and which in solution yield an ion of a desired color may be reacted with the sodium carboxy methyl cellulose to form a complex salt and are considered to be within the inventive concept.

It should also be noted that the concentration of alkali used with the tetrahydrofurfuryl alcohol should be kept low as an amount greater than about 1% may tend to drive the reaction product of the cellulose derivative and the inorganic salt in the reverse direction.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

We claim:

1. As a new product, a stain consisting of 3 parts by weight of sodium carboxymethyl cellulose reacted with approximately 100 parts of water and 20 parts of saturated copper sulfate solution, the reaction product being dissolved in tetrahydrofurfuryl alcohol containing sodium hydroxide up to about 1% by weight of said alcohol.

2. A process for producing a wood stain comprising the steps of reacting a saturated water solution of copper sulfate with sodium carboxymethyl cellulose to form a brown resinous precipitate, washing and drying the said precipitate, and dissolving the precipitate in tetrahydrofurfuryl alcohol containing sodium hydroxide up to about 1% by weight of said alcohol.

3. As a new product, a stain comprising a copper sulfate salt of sodium carboxymethyl cellulose dissolved in alkaline tetrahydrofurfuryl alcohol containing 0.5% of sodium hydroxide.

4. As a new product, a stain consisting of the reaction product of a copper salt and sodium carboxymethyl cellulose, said reaction product being dissolved in tetrahydrofurfuryl alcohol containing sodium hydroxide up to about 1% by weight of said alcohol.

5. As a new product, a stain consisting of the reaction product of sodium carboxymethyl cellulose and copper sulfate, said product being dissolved in tetrahydrofurfuryl alcohol containing a small amount of sodium hydroxide but not more than about 1% by weight of said alcohol.

6. As a new product, a staining composition for wood consisting of a copper sulfate salt of sodium carboxymethyl cellulose, said salt being dispersed in tetrahydrofurfuryl alcohol containing sodium hydroxide up to about 1% by weight of said alcohol.

7. A process for producing a wood stain which consists of the steps of dissolving sodium carboxymethyl cellulose in water, introducing into the resultant solution a saturated solution of copper sulfate in water, separating the precipitate formed, drying the same to produce a brown colored product, and dissolving the resultant product in tetrahydrofurfuryl alcohol containing sodium hydroxide up to about 1% by weight of said alcohol.

8. A process for producing a wood stain composition consisting of reacting an aqueous solution of copper sulfate with sodium carboxymethyl cellulose dissolved in water to form a precipitate, washing and drying said precipitate, dissolving said precipitate in a vehicle of tetrahydrofurfuryl alcohol containing 0.5% sodium hydroxide, and applying to wood to stain the same.

No references cited.